(12) United States Patent
Vannarsdall

(10) Patent No.: US 8,899,967 B2
(45) Date of Patent: Dec. 2, 2014

(54) INTERRUPTED RING GATE MOLDING APPARATUS

(75) Inventor: David Chris Vannarsdall, Columbus, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 180 days.

(21) Appl. No.: 13/523,423

(22) Filed: Jun. 14, 2012

(65) Prior Publication Data

US 2013/0337104 A1 Dec. 19, 2013

(51) Int. Cl.
*B29C 45/18* (2006.01)
(52) U.S. Cl.
USPC .......................................................... 425/595
(58) Field of Classification Search
USPC .......................................................... 425/595
See application file for complete search history.

(56) References Cited

U.S. PATENT DOCUMENTS

| | | | |
|---|---|---|---|
| 4,403,933 A * | 9/1983 | Davis et al. | 425/129.1 |
| 2011/0130216 A1* | 6/2011 | Kim et al. | 473/372 |

FOREIGN PATENT DOCUMENTS

| | | |
|---|---|---|
| DE | 3643833 A1 | 6/1988 |
| JP | H01310922 A | 12/1989 |
| JP | 2002264175 A | 9/2002 |

OTHER PUBLICATIONS

Artikelgestalung Und Werkzeugkonstruktion Bei Der Pritzguβverarbeitung Von Niederdruck-Polyäthylen Und Polypropylen Speyer Am Rhein; BD. 12, No. 10, Oct. 1961, pp. 453-458, XP001173327.

* cited by examiner

*Primary Examiner* — Richard Crispino
*Assistant Examiner* — John Robitaille
(74) *Attorney, Agent, or Firm* — Daniel J. Sepanik, Esq.; Harness, Dickey & Pierce, P.L.C.

(57) ABSTRACT

A molding apparatus includes a plurality of inter-engaging mold cavity components and a plurality of inter-engaging gate inserts that combine with the plurality of inter-engaging mold cavity components to define an annular mold cavity. The plurality of inter-engaging gate inserts combine to define a plurality of separate arcuate shaped gate segments that each communicate with the annular mold cavity.

17 Claims, 5 Drawing Sheets

INTERRUPTED RING GATE MOLDING APPARATUS

FIELD

The present disclosure relates to a molding apparatus, and more particularly to an interrupted ring gate molding apparatus.

BACKGROUND

This section provides background information related to the present disclosure which is not necessarily prior art.

Various seals and other molded articles are commonly made including complex geometries for meeting the specific needs of a desired application. In addition, these seals and other molded articles are made from various materials which again, are chosen based upon a specific application. The ability to mold various materials in complex geometries can be a limit on the material options that are available for a specific geometry. The ability of certain materials to transfer from the mold without damage, as well as the ability of the compound to flow into the mold cavity as required, are examples of problems which historically face seal designers as well as designers of other molded articles.

SUMMARY

This section provides a general summary of the disclosure, and is not a comprehensive disclosure of its full scope or all of its features.

A molding apparatus includes a plurality of inter-engaging mold cavity components and a plurality of inter-engaging gate inserts that combine with the plurality of inter-engaging mold cavity components to define an annular mold cavity for forming a seal or other article. The plurality of inter-engaging gate inserts combine to define a plurality of separate arcuate shaped gate segments that each communicate with the annular mold cavity for delivering a molding material into the mold cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
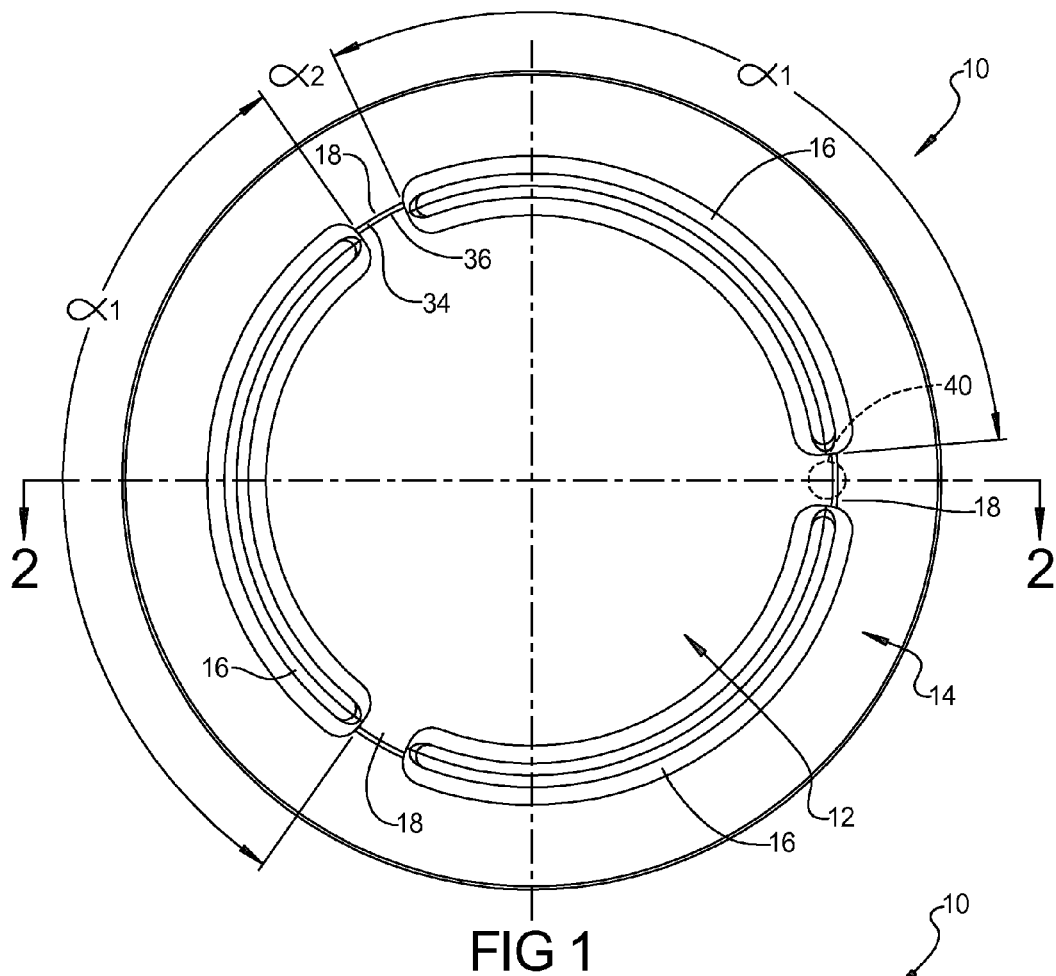
FIG. 1 is a top plan view of an interrupted ring gate molding apparatus according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, an interrupted ring gate molding apparatus 10 according to the principles of the present disclosure will now be described. As shown in FIG. 1, the interrupted ring gate molding apparatus 10 includes a central gate insert 12 and an outer gate insert 14 which define a plurality of interrupted arcuate shaped gate segments 16 therebetween. The elongated arcuate-shaped gate segments 16 are interrupted by gate interruption portions 18. The arcuate-shaped gate segments 16, as well as the gate interruption portions 18, can all lie within a common circle. The number of arcuate shaped gate segments 16 can vary between 2 and 6. Depending upon the number of gate segments 16, the arcuate angle $\alpha 1$ of the gate segments can range from 50° to 170° while the arcuate angle $\alpha 2$ of the interruption portions 18 can range from 5° to 45°. In the illustrated embodiment of FIG. 1, the arcuate angle $\alpha 1$ of the gate segments is 110° and the arcuate angle of the interruption portions is 10°.

Figure 2:
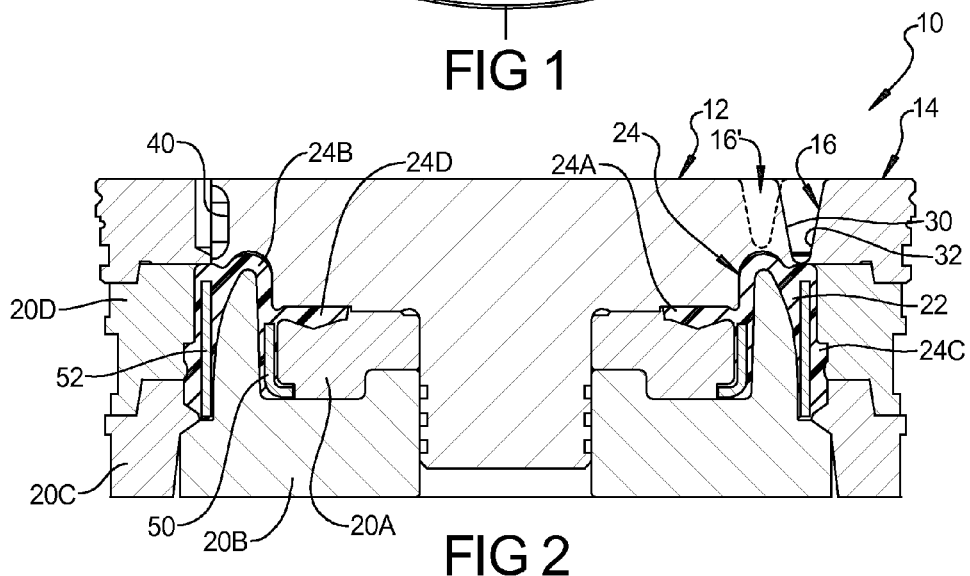
FIG. 2 is a cross-sectional view of the interrupted ring gate molding apparatus taken along line 2-2 of FIG. 1.
Figure 3:
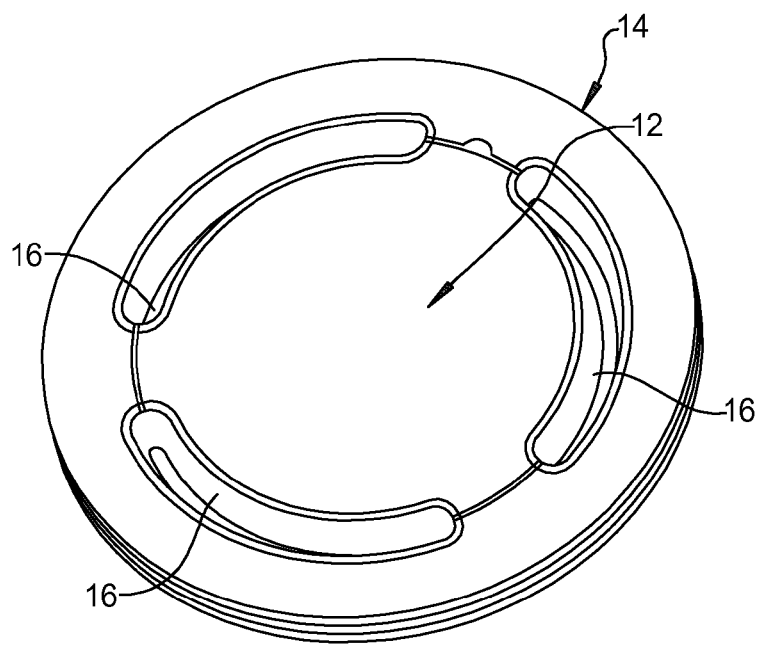
FIG. 3 is a top perspective view of the gate inserts for forming the interrupted ring gate according to the principles of the present disclosure.
Figure 4:
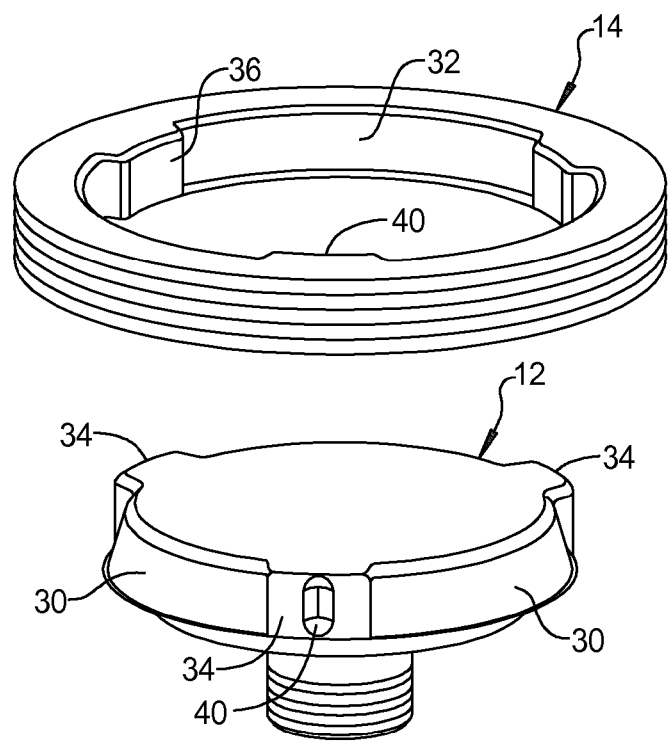
FIG. 4 is an exploded perspective view of the gate inserts shown in FIG. 3.

With reference to FIG. 2, the interrupted ring gate molding apparatus 10 is shown in its completed assembly along with mold cavity components 20A-20D which are inter-engaged and combined with the central gate insert 12 and outer gate insert 14 to define a mold cavity 22 that defines the complex geometry of a seal 24 or other article to be molded. By way of non-limiting example, the inner mold cavity component 20A and intermediate mold cavity component 20B can be utilized for forming portions of an inner seal structure 24A and an intermediate seal structure 24B while the outer mold cavity components 20C, 20D can be utilized for forming an outer seal structure 24C.

The central gate insert 12 can include a plurality of arcuate gate inner wall portions 30 and the outer gate insert 14 can include a plurality of corresponding arcuate-shaped gate outer wall portions 32. Arcuate-shaped gate segments 16 taper inward and define an opening into the mold cavity 22. The gate interruption portions 18 can include an outer surface 34 of the central gate insert 12 and an inner surface 36 of the outer gate insert 14 that provide support between the central and outer gate inserts 12, 14. The surfaces 34, 36 can be provided with a locking feature 40 that engage the central gate insert 12 and outer gate insert 14 in a locked non-rotatable position relative to one another. The locking feature 40 can include a dowel pin or other arrangement or projections and recesses.

As illustrated in phantom in FIG. 2, the location of the gate segments 16 can be placed at an optimal location along a side of the mold cavity rather than just at the inner diameter as is required for traditional full ring gate molding apparatus. This allows for the introduction of molding material at a more optimal location within the mold cavity.

Figure 8:
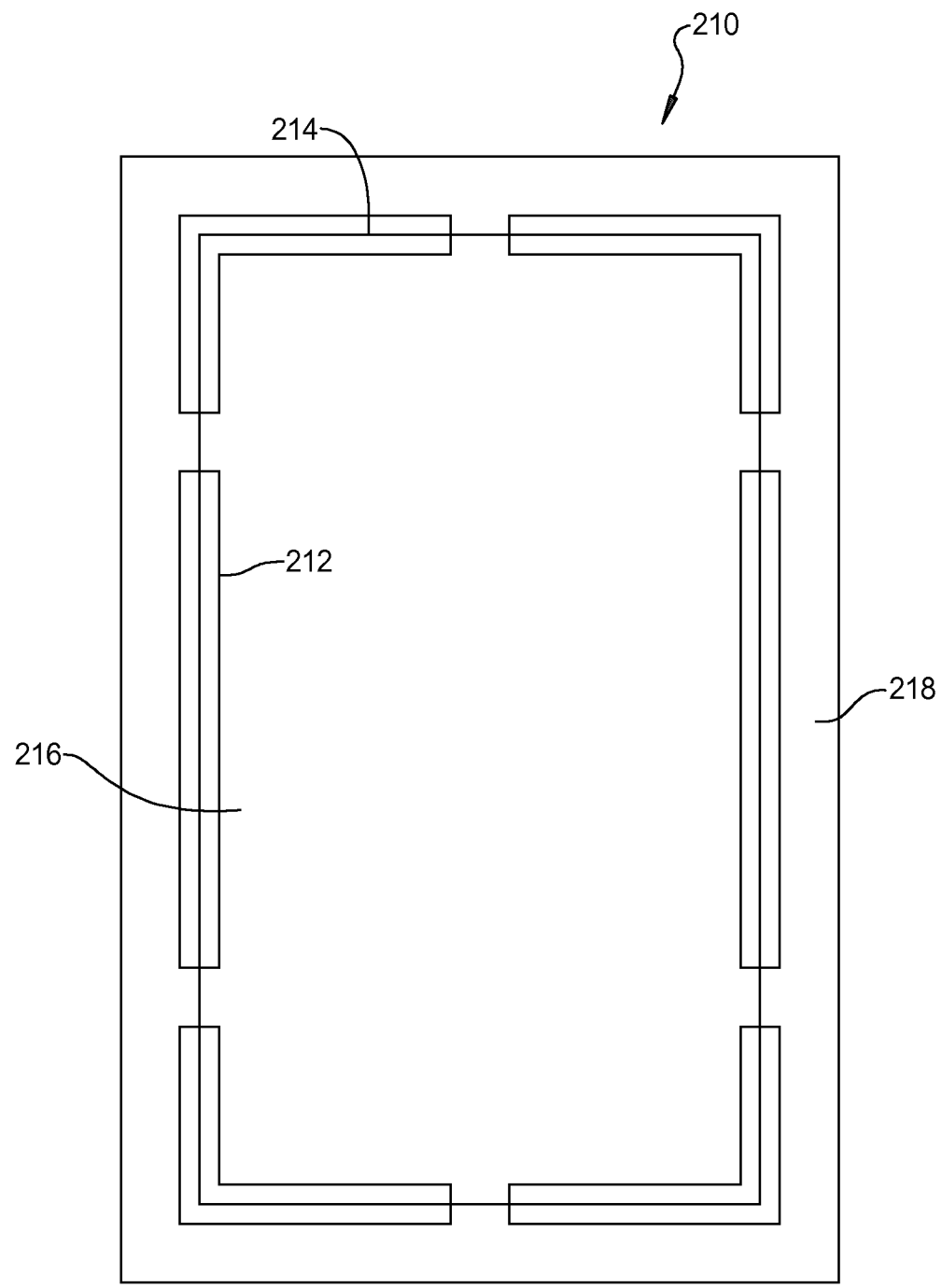
FIG. 8 is a top plan view of an interrupted ring gate molding apparatus having straight and angled gate segments.

With reference to FIG. 8, the interrupted ring molding apparatus 210 is illustrated as including both elongated straight gate segments 212 and elongated angled gate segments 214 for forming either square or rectangular annular articles. It should further be understood that the principles of the present disclosure can be applied to oval or other shaped annular configurations, such as polygonal and irregular shapes. The gate segments 212, 214, are formed between a central insert 216 and an outer insert 218 in the same manner as discussed above with respect to the prior embodiment. In addition, a series of mold components can be arranged in the same manner for defining a complex cross-sectional geometry of the molded article. It should be understood that an arrangement of either straight, curved, angled, or other shaped gate segments can be utilized for molding articles having different annular configurations.

In operation, the mold cavity components 20A-20D and the central and outer gate inserts 12, 14 are inter-engaged, as illustrated in FIG. 2, in order to define the mold cavity 22 therebetween. The molding material is then introduced through the arcuate-shaped gate segments 16 into the mold cavity 22 so as to fill the mold cavity 22 to form the seal member 24 or another article. By way of example, with rubber or other material, the mold cavity can be heated at 300-400° F. and the material is pushed through under pressure between 1500-4000 psi and held in the mold cavity to cure. It should be noted that seal inserts such as inner seal insert 50 and outer seal insert 52 can optionally be inserted into the cavity and overmolded within the seal structure 24. The area of the gate segments 16 can be up to three times larger than a traditional gating arrangement and allows the molding material to be flowed into the mold cavity 22 more gradually, rather than forcing the material into the cavity, as required by traditional gating.

Figure 5:
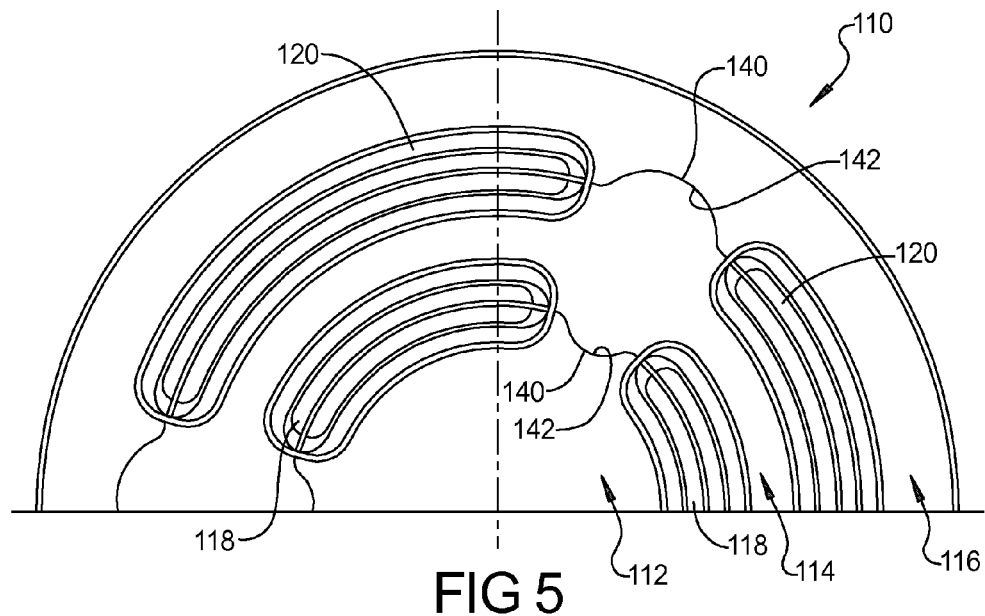
FIG. 5 is a partial top plan view of an alternative interrupted ring gate molding apparatus according to the principles of the present disclosure.
Figure 6:
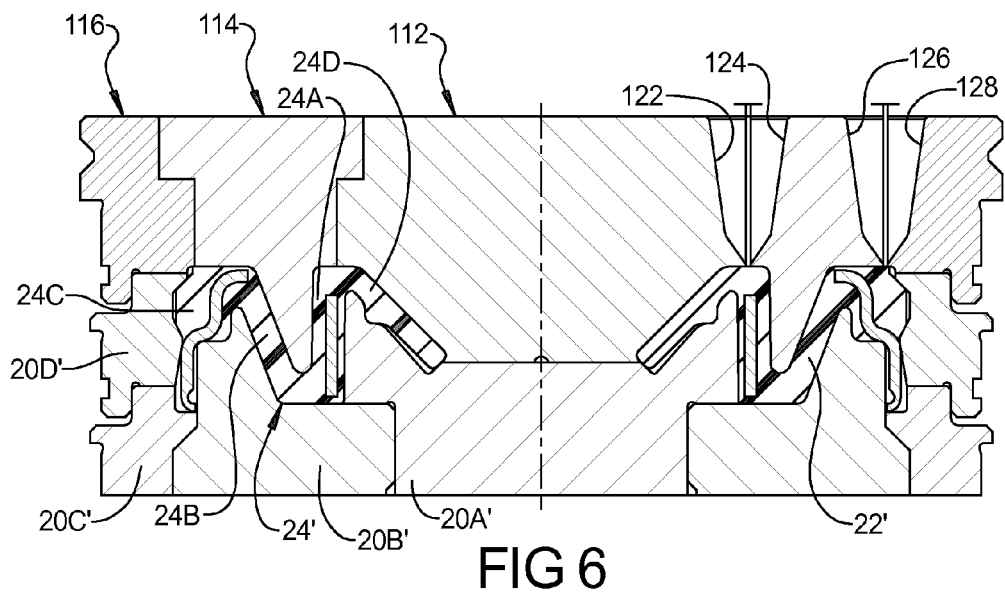
FIG. 6 is a cross-sectional view taken along line 6-6 of the interrupted ring gate molding apparatus shown in FIG. 5.
Figure 7:
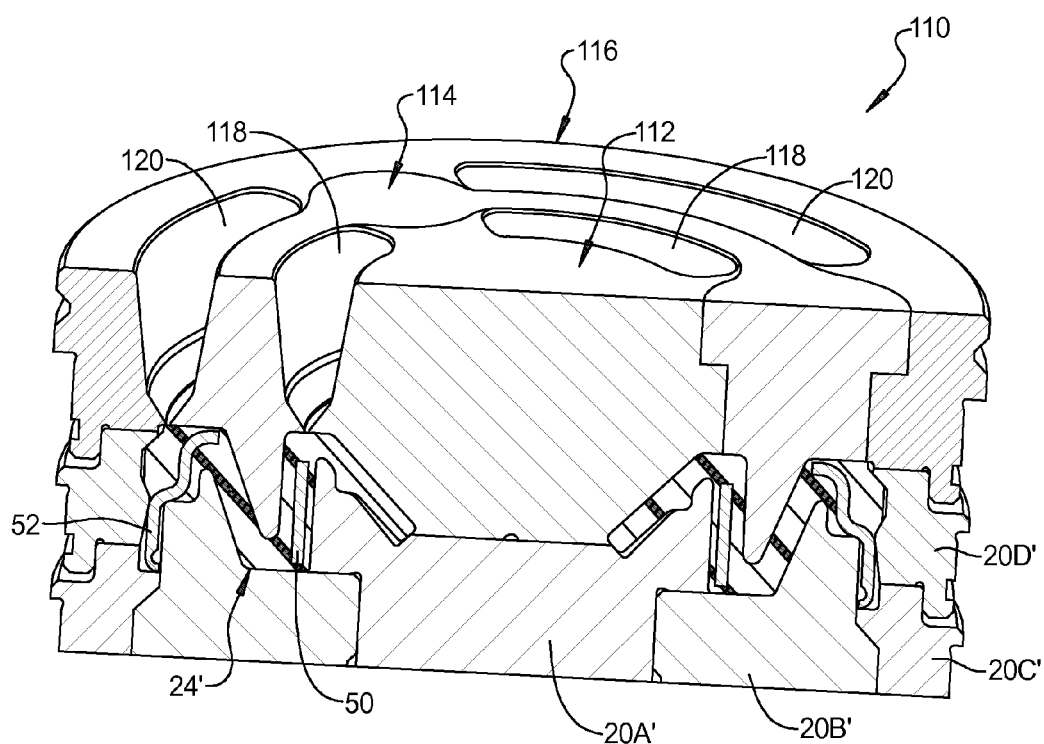
FIG. 7 is a cut-away perspective view of the interrupted ring gate molding apparatus shown in FIG. 5.

With reference to FIGS. 5-7, an alternative interrupted ring gate mold apparatus 110 according to the present disclosure will now be described. As shown in FIG. 5, the interrupted ring gate mold apparatus 110 includes a central gate insert 112, an intermediate gate insert 114, and an outer gate insert 116. A series of arcuate-shaped gate segments 118 are defined between the central gate insert 112 and intermediate gate insert 114 in the same manner as described above with respect to the embodiment of FIGS. 1-4. Furthermore, a second series of gate segments 120 are defined between the intermediate gate insert 114 and outer gate insert 116 in the manner as described above with respect to the embodiment of FIGS. 1-4. In particular, the central gate insert 112 includes gate inner wall portions 122 that align with gate outer wall portions 124 of the intermediate gate insert 114 to define the elongated gate segments 118 that lie on a common circle. Furthermore, the intermediate gate insert 114 includes gate inner wall portions 126 that correspond with gate outer wall portions 128 provided on the outer gate insert 116 in order to define the elongated gate segments 120 that lie on a common circle that is larger than the common circle of the gate segments 118.

Each of the gate segments 118, 120 provide an opening into the mold cavity 22' that is defined between the inter-engaging mold cavity components 20A'-20D' and the central gate insert 112, intermediate gate insert 114, and outer gate insert 116. After the mold cavity components 20A'-20D' are inter-engaged along with the central, intermediate, and outer gate inserts 112, 114, 116, mold material is introduced through the elongated arcuate-shaped gate segments 118, 120 into the mold cavity 22' for forming the seal 24'. It should be noted that an inner seal insert 50 and an outer seal insert 52 can be inserted into the mold cavity 22' so as to be overmolded or at least partially overmolded within the seal 24'.

The interrupted ring gate molding apparatus 10, 110, as disclosed herein, has been found to be useful for injection molding for seal components 24, 24' as shown in FIGS. 2 and 6 that include the outer portion 24C, an inner seal 24A, and an intermediate web 24B extending between the outer portion 24C and the inner seal 24A. The outer portion 24C is radially offset outwardly relative to the inner seal 24A. The outer portion 24C defines an outboard sealing surface for engaging a sealing surface of a bore in an installed position. Similarly, the inner seal 24A defines an inboard sealing surface for engaging a corresponding sealing surface of a shaft or other member in an installed position. The outboard and inboard sealing surfaces of the seal may be made of an elastomeric material such as rubber or other materials, although other materials may be used. The inner seal can include a flap 24D that in an uninstalled condition can extend at an angle relative to the inner seal insert 50 of between 5° and up to 90° relative thereto. FIG. 2 illustrates the flap 24D extending at a 90° angle to the inner seal insert 50, and FIG. 6 illustrates the flap 24D at an angle of approximately 45° to the inner seal insert.

It should be noted that the inner gate segments 118 can be provided in alignment for introducing molding material into the mold cavity 22' directly forming the inner seal portion 24A and flap 24D while the outer gate segments 120 can introduce molding material into the mold cavity 22' directly for forming the outer seal portion 24C. As the molding material fills the cavity 22', the molding material from the inner gate segments 118 meets with the molding material from the outer gate segments 120 along the web portion 24B of the seal 24'.

The central gate insert 112, intermediate gate insert 114, and outer gate insert 116 can also be provided with corresponding projecting and recessed interlocking features 140, 142 as best illustrated in FIG. 5 that interlock the inserts 112-116 to prevent relative rotation therebetween.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A molding apparatus, comprising:
a plurality of inter-engaging mold cavity components; and
a plurality of inter-engaging gate inserts that combine with said plurality of inter-engaging mold cavity components to define an annular mold cavity, said plurality of inter-engaging gate inserts combine to define a plurality of separate elongated gate segments that each communicate with said annular mold cavity.

2. The molding apparatus according to claim 1, wherein said plurality of separate elongated gate segments are arcuate-shaped and disposed along a common circle.

3. The molding apparatus according to claim 1, wherein said plurality of inter-engaging gate inserts include a central gate insert and an outer gate insert disposed around said central gate insert for defining said plurality of separate elongated gate segments therebetween.

4. The molding apparatus according to claim 3, further comprising a first locking feature on said central gate insert and a second locking feature on said outer gate insert for mating with said first locking feature of said central gate insert.

5. The molding apparatus according to claim 2, wherein said plurality of separate arcuate shaped elongated gate segments each extend along an equal arc angle.

6. The molding apparatus according to claim 2, wherein each of said plurality of separate arcuate shaped gate segments are separated by an equal arc angle.

7. The molding apparatus according to claim 1, wherein said annular mold cavity has a cross section having an annular outer portion and an annular inner portion connected by a radially extending portion extending therebetween.

8. The molding apparatus according to claim 1, wherein a first plurality of said plurality of separate elongated gate segments are arcuate shaped and disposed along a first common circle and a second plurality of said plurality of separate elongated gate segments are arcuate shaped and disposed along a second common circle larger than said first common circle.

9. The molding apparatus according to claim 8, wherein said plurality of inter-engaging gate inserts include a central gate insert and an intermediate gate insert disposed around said central gate insert for defining said first plurality of said plurality of separate elongated gate segments therebetween and an outer gate insert disposed around said intermediate gate insert for defining said second plurality of said plurality of separate elongated gate segments therebetween.

10. The molding apparatus according to claim 9, further comprising a first locking feature on said central gate insert and a second locking feature on said intermediate gate insert for mating with said first locking feature of said central gate insert and a third locking feature on said intermediate gate insert and a fourth locking feature on said outer gate insert for mating with said third locking feature of said intermediate gate insert.

11. The molding apparatus according to claim 8, wherein said first plurality of said plurality of separate arcuate shaped elongated gate segments each extend along an equal first arc angle and said second plurality of said plurality of separate arcuate shaped elongated gate segments each extend along an equal second arc angle.

12. The molding apparatus according to claim 8, wherein each of said first plurality of said plurality of separate arcuate shaped elongated gate segments are separated by an equal first arc angle and each of said second plurality of said plurality of separate arcuate shaped elongated gate segments are separated by an equal second arc angle.

13. The molding apparatus according to claim 1, wherein said annular mold cavity has a cross section having an annular outer portion and an annular inner portion connected by a radially extending portion extending therebetween and said first plurality of said plurality of separate elongated gate segments are in communication with said annular inner portion and said second plurality of said plurality of separate elongated gate segments are in communication with said annular outer portion.

14. The molding apparatus according to claim 1, wherein said plurality of separate elongated gate segments include at least one straight gate segment.

15. The molding apparatus according to claim 1, wherein said plurality of separate elongated gate segments include at least one angled gate segment.

16. The molding apparatus according to claim 1, wherein a first plurality of said plurality of separate elongated gate segments are disposed in an inner annular pattern and a second plurality of said plurality of separate elongated gate segments are disposed in an outer annular pattern outside said inner annular pattern.

17. The molding apparatus according to claim 16, wherein said plurality of inter-engaging gate inserts include a central gate and an intermediate gate insert disposed around said central gate insert for defining said first plurality of said plurality of separate elongated gate segments therebetween and an outer gate insert disposed around said intermediate gate inserts for defining said second plurality of said plurality of separate elongated gate segments therebetween.

* * * * *